(No Model.)
G. RICHARDSON.
PROCESS OF MANUFACTURING ARTIFICIAL STONE, &c.
No. 461,888. Patented Oct. 27, 1891.
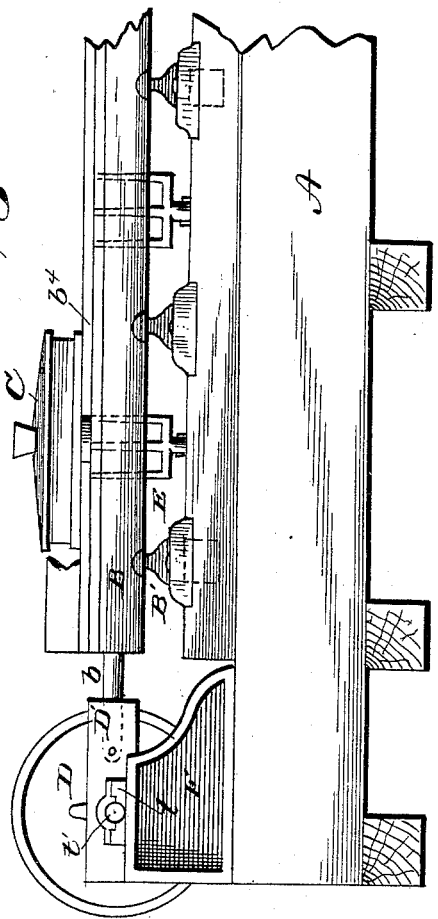
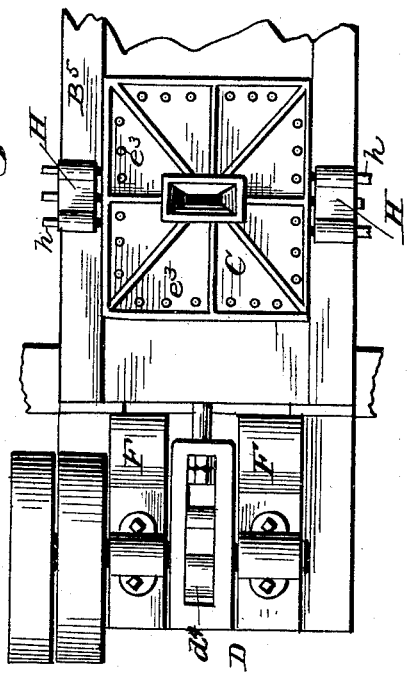
WITNESSES
F. L. Ourand
Alx. Scott
INVENTOR
George Richardson

UNITED STATES PATENT OFFICE.

GEORGE RICHARDSON, OF WASHINGTON, DISTRICT OF COLUMBIA.

PROCESS OF MANUFACTURING ARTIFICIAL STONE, &c.

SPECIFICATION forming part of Letters Patent No. 461,888, dated October 27, 1891.

Application filed September 7, 1889. Serial No. 323,240. (No model.)

*To all whom it may concern:*

Be it known that I, GEORGE RICHARDSON, a citizen of the United States, residing at Washington, in the District of Columbia, have invented certain new and useful Improvements in the Process of Manufacturing Artificial Stone, &c.; and I do hereby declare the following to be a full, clear, and exact description of the invention, such as will enable others skilled in the art to which it appertains to make and use the same.

My invention relates to an improved process for solidifying and hardening cement in the manufacture of concrete articles, such as paving-stone, building-blocks, and like articles made from sand and cement, or of a concrete mixture of which cement is the principal or a part of the ingredients used.

Heretofore the cement or concrete mixture has been placed in the mold and allowed to remain therein until the cement has set, when it is removed from the mold and placed in an indurating-chamber and subjected to the action of cool carbonic-acid gas and hot steam or to the action of cool carbonic-acid gas and watery vapor, which are mixed before they enter the indurating-chamber. These processes I have found to be objectionable in that if the cement mixture is not freed of the air-spaces before the cement is allowed to set the block will be found to be full of air-cells or porous, and if subjected to the action of carbonic-acid gas and hot steam or watery vapor while the cement is in a green state the lasting quality of the cement is destroyed; and, again, if the cement blocks are subjected to the action of a mixture of cool carbonic-acid gas and steam, the blocks will not be hardened throughout, but will leave the center of the block practically as soft as when it left the mold.

My long practical experience in manufacturing cement concrete articles has fully demonstrated that in order to produce a solid non-porous article every particle of air in the mixture and all surplus water must be driven from the concrete mixture before it is allowed to set in the mold, and, also, that after being removed from the mold the article must be thoroughly saturated or impregnated with cool carbonic-acid gas and cool steam or watery vapor before the hot steam is allowed to come in contact with the cement.

The object of my invention is to provide a process by which cement or concrete articles may be produced, which will be non-porous and more thoroughly hardened than has been attained by any of the processes heretofore known; and to carry my invention into effect I first take fixed parts of sand and cement and mix therewith sufficient water to reduce the mass to a solid slushy concrete, after which I place the mixture in a mold of any desired shape, which is provided with a clamping-cover having a series of apertures or perforations. After the covers have been clamped tightly on the mold I subject said mold and contained cement mixture to a series of jarring or jolting motions on a machine provided for the purpose for a period sufficient to drive out every particle of air and surplus water from the mixture through the perforations in the cover, the covers being more tightly clamped as the operation proceeds.

Figure 1 of drawings represents a side elevation of my improved machine with a paving-block mold on it in position for solidifying concrete. Fig. 2 is a top plan view of the same, showing a paving-block mold thereon and a part of the shaking-table broken away to show the device for removing the blocks from the mold.

In the drawings, A represents the frame or bed of the machine; B, the shaking-table, upon which the mold C is mounted; D, the mechanism for reciprocating the table, and E the lifter for removing the block from the mold.

A more full description, together with the novelty of this invention, is shown and claimed in a separate application filed by me October 16, 1889, Serial No. 327,155.

Additional concrete is supplied through the hopper in the cone to fill up the vacancies in the mold caused by the jarring, thus keeping the mold full, or nearly so, during the process of compacting. This jarring and jolting motion also causes the particles of cement to thoroughly unite and leave a homogeneous mass free from air-spaces and surplus water. After the cover is removed and the cement in the mold has set sufficient to bear handling, it is placed in a gas-tight chamber and subjected to the action of cool carbonic-acid gas and cool steam or watery vapor until the concrete has become thoroughly impregnated with the cool carbonic-acid gas when it will be found that the cement article is only partially hardened, leaving the center practically as soft as when first placed in said indurating-chamber. I then subject it during the remainder of its stay in the indurating-chamber to the action of cool carbonic-acid gas and hot steam, which has the effect to thoroughly harden the cement throughout the block or mass, leaving a more solid and harder block than has heretofore been attained by any of the known processes. The hot steam also has the effect to set any coloring-matter which may have been previously applied in case it is desired to color the cement article, and the slushy condition of the concrete makes the cement adhere more to the sand or broken stone than it would if the cement-mixture were made in a dry mixture, which has heretofore been tried, and the holes in the top of the cover allow the surplus water and air to be driven out as the particles become more thoroughly compacted and united, thus making a cement mixture as hard as adamant itself.

Having described my invention, what I claim, and desire to secure by Letters Patent, is—

1. The process of solidifying and hardening concrete in the manufacture of artificial stone, which consists, first, in subjecting a plastic mass of concrete to sudden jars or shocks while contained in a mold having a perforated cover; secondly, hardening said concrete after it has set by subjecting it to the action of cool carbonic-acid gas and cool watery vapor in a closed chamber until the concrete is saturated with said gas and vapor, and, finally, subjecting it to cool carbonic-acid gas and hot steam or vapor, substantially as and for the purposes described.

2. The process herein described for freeing concrete mixtures of air and surplus water and molding the same into a solid form, which consists in subjecting a wet mixture of concrete to a series of jars or shocks in a mold, which is kept full, or nearly so, to enable the surplus water to flow off as the jars compact the concrete, substantially as and for the purpose described.

3. The process herein described for hardening concrete articles which have been previously molded in the desired form, the same consisting in treating the article to the action of cool carbonic-acid gas and vapor until it is permeated with said gas and vapor, and hardened to such a degree that hot steam or gas will not injure the cement, and then subjecting it to carbonic-acid gas and hot steam, substantially as and for the purposes described.

4. The process of hardening artificial stone, which consists in treating the stone which has been previously colored with any other color than the natural color of the sand and cement mixture and subjected to a series of jarring motions thereto to the action of cooled carbonic-acid gas and vapor and then to carbonic-acid gas and hot steam, substantially as and for the purposes described.

In testimony whereof I affix my signature in presence of two witnesses.

GEORGE RICHARDSON.

Witnesses:
E. T. WALKER,
L. SIMMONS.